United States Patent [19]
Giori et al.

[11] 3,826,265
[45] July 30, 1974

[54] MECHANICAL PULSE GENERATOR FOR CARDIAC PACER

[75] Inventors: Francis A. Giori, Clarence; Alvin S. Topolski, Tonawanda, both of N.Y.

[73] Assignee: Medtronic, Inc., Minneapolis, Minn.

[22] Filed: Oct. 5, 1972

[21] Appl. No.: 295,184

[52] U.S. Cl. .......................................... 128/419 P
[51] Int. Cl. ............................................ A61n 1/30
[58] Field of Search ............ 128/419 P, 419 R, 421, 128/422

[56] References Cited
UNITED STATES PATENTS

| | | | |
|---|---|---|---|
| 3,486,506 | 12/1969 | Auphan | 128/419 P |
| 3,554,199 | 1/1971 | Auphan | 128/419 P |
| 3,563,245 | 2/1971 | McLean et al. | 128/419 P |
| 3,693,625 | 9/1972 | Auphan | 128/419 P |

OTHER PUBLICATIONS

Myers et al., "American Journal of Medical Electronics," October–December, 1964, pp. 233–236.

*Primary Examiner*—William E. Kamm
*Attorney, Agent, or Firm*—Edwin T. Bean, Jr.; Martin G. Linham, Jr.; Irving S. Rappaport

[57] ABSTRACT

A medical electronic pulse generator comprising a source delivering mechanical power at a regulated rate, a motion producing means coupled to the output of the source for cyclically producing a relatively rapid mechanical motion of a duration less than that of each cycle of said pulse generator and having a consistent velocity characteristic, and a transducer means operatively associated with the motion producing means for converting the motion produced thereby to an electrical pulse. The motion producing means includes a first inertial member or element drivenly connected to the source for a portion of each cycle and freely movable during the remainder of each cycle, a second inertial member or element, and an elastic coupling means (e.g. a torsion spring) connected between the inertial members. The inertial members are stopped at predetermined times during each cycle of pulse generation, whereby the kinetic energy of one of the members after generation of a pulse is utilized to store energy in the torsion spring and to position the inertial members for the next cycle. The electrical output pulses are produced at a constant repetition frequency as determined by the mechanical power source and at a constant amplitude as determined by the consistent velocity characteristic of the motion producing means.

13 Claims, 14 Drawing Figures

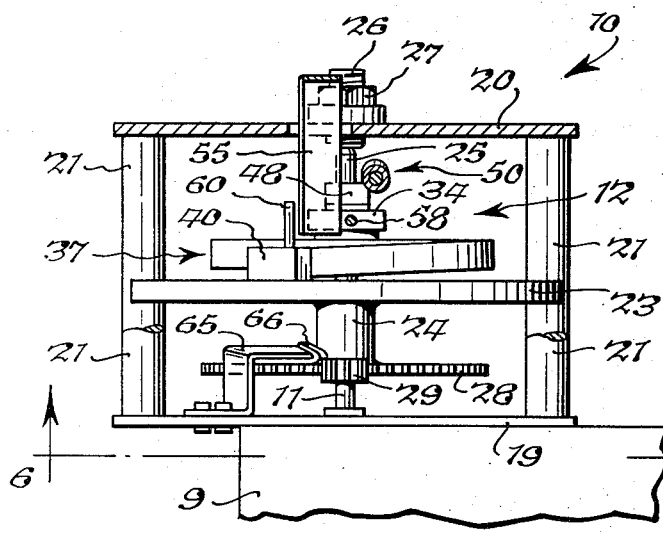
Fig. 4.
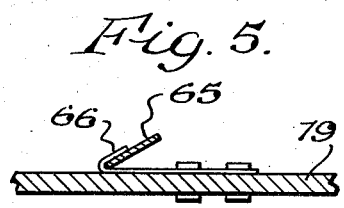
Fig. 5.
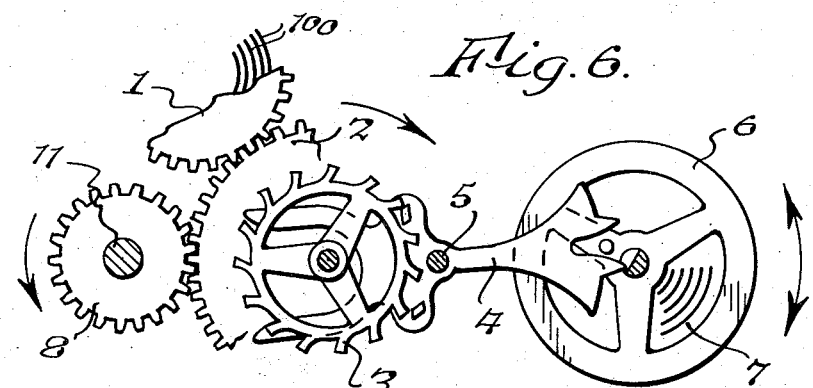
Fig. 6.
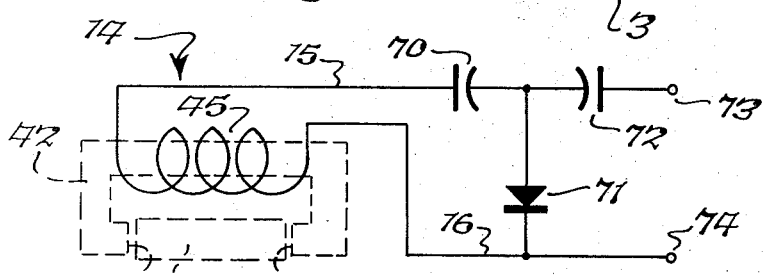
Fig. 8.
Fig. 9.
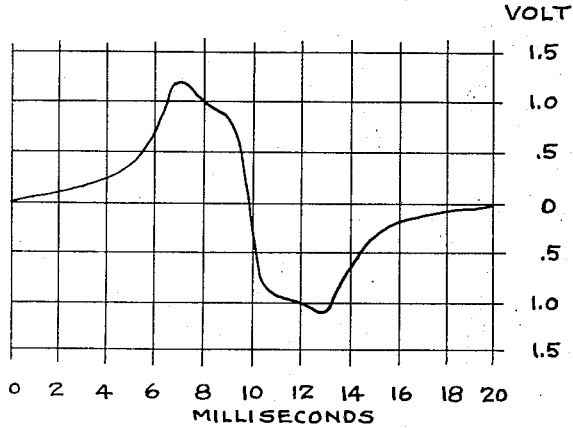
Fig. 7.

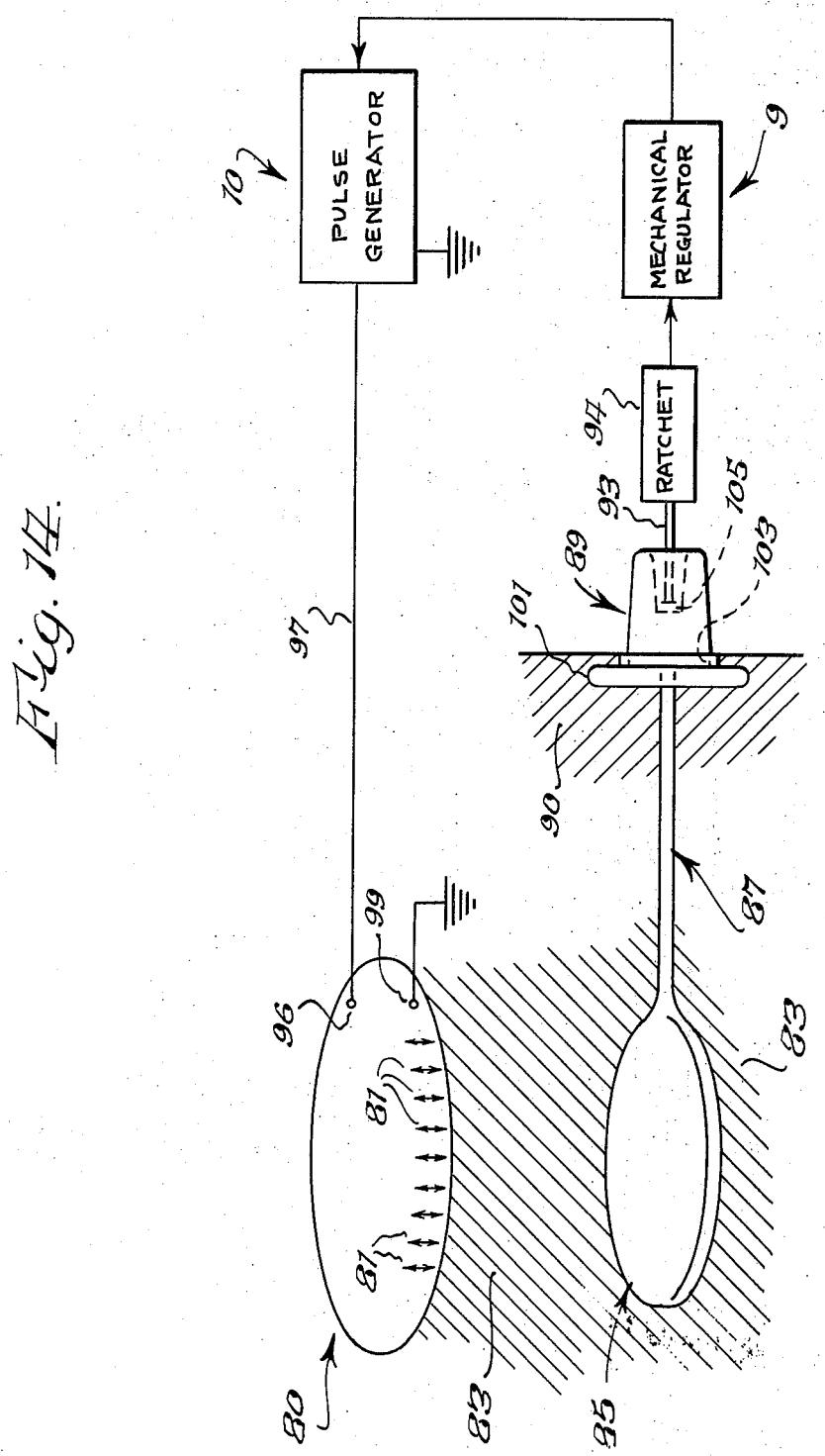

MECHANICAL PULSE GENERATOR FOR CARDIAC PACER

BACKGROUND OF THE INVENTION

This invention relates to electrical pulse generators and, more particularly, to a pulse generator having mechanical driving and timing means.

One area of use of the present invention is for artificial cardiac pacer, particularly of the implantable type, although the principles of the invention can be variously applied. Existing cardiac pacer including pulse generators which are entirely electronic are characterized by problems of possible circuit failure and of electrochemical aging and battery depletion. Heretofore, attempts to solve these problems have not included the approach of completely circumventing the electronics reliability problem.

A pulse generator for cardiac pacer, wherein the pulse generator driving and timing means is entirely mechanical, would have significant advantages. For example, a mechanical pacer as compared with existing electronic pacer would have higher inherent reliability, absence of electrochemical elements such as batteries, a lifetime limited only by wear and component failure rather than by depletion of power supplies, and, accordingly, a more accurately predictable useful lifetime.

There are several important considerations to be met in the design of a mechanical pulse generator for use in an artificial cardiac pacer. One concerns the storage and use of input mechanical power, and the requirement that the mechanical energy expended in producing each pulse represent only a small fraction of the total stored mechanical energy. Related to this consideration is the importance of maintaining constant the selected repetition frequency and amplitude of the output electrical pulses.

SUMMARY OF THE INVENTION

It is, therefore, an object of this invention to provide a new and improved mechanical pulse generator for an artificial cardiac pacer.

It is a further object of this invention to provide a mechanical pulse generator wherein the mechanical energy expended in producing each electrical pulse represents only a small fraction of the stored mechanical energy.

It is an additional object of this invention to provide a mechanical pulse generator wherein the intermittent mechanical power level available during the generation of the electrical pulse is many times greater than the continuous mechanical power level delivered to the mechanical pulse generator.

It is a more particular object of this invention to provide such a mechanical pulse generator wherein the output electrical pulses have a constant repetition frequency and amplitude, as required in cardiac stimulation.

The present invention provides a mechanical pulse generator including a source of mechanical power for delivering output mechanical power at a regulated rate. The regulated power is utilized by a motion producing means to provide a relatively rapid and cyclic mechanical motion having a constant velocity characteristic. Each mechanical motion, in turn, is converted into an electrical pulse. The electrical pulses occur at a constant repetition frequency as determined by the mechanical power source and the pulses have a constant amplitude as determined by the consistent velocity characteristic of the motion producing means.

The foregoing and additional advantages and characterizing feature of the present invention will become clearly apparent upon a reading of the ensuing detailed description together with the included drawing wherein:

BRIEF DESCRIPTION OF THE DRAWING FIGURES

FIG. 4 is a sectional view taken about on line 4—4 of FIG. 1;

FIG. 5 is a fragmentary sectional view taken about on line 5—5 of FIG. 3;

FIG. 6 is a view taken about on line 6—6 in FIG. 4 and showing one form of a mechanical power source for the apparatus of the present invention, some parts being omitted and others being shown only fragmentarily for greater clarity and ease in illustration;

FIG. 7 illustrates the waveform of an output electrical pulse obtained during one cycle of operation of the apparatus of the present invention;

FIG. 8 is a schematic diagram of a wave-shaping circuit which can be included in the apparatus of the present invention;

FIG. 9 illustrates the waveform produced by the circuit of FIG. 8;

FIG. 14 is a schematic block diagram of an arrangement for driving the regulated mechanical power source of FIG. 6.

DETAILED DESCRIPTION OF THE ILLUSTRATED EMBODIMENT

Figure 1:
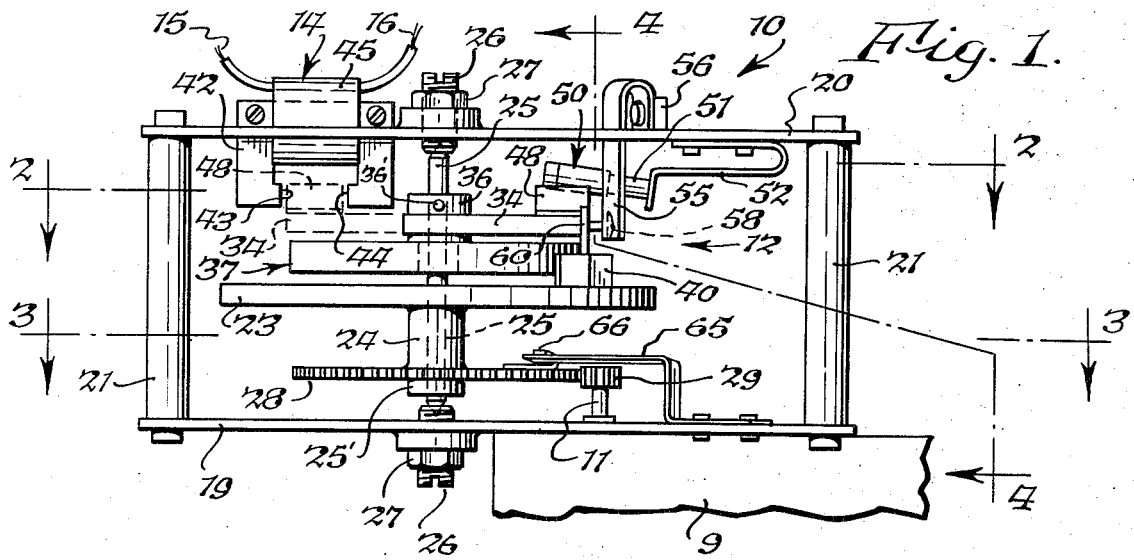
FIG. 1 is a fragmentary elevational view of a mechanical pulse generator according to the present invention.

Referring now to FIGS. 1–6 there is shown a mechanical pulse generator 10 according to the present invention. Pulse generator 10 includes a source of mechanical power 9 for delivering mechanical power at a regulated or controlled rate. In the present illustration, the regulated output mechanical power is in the form of the rotation of a shaft 11. An example of one mechanical power source is shown in detail in FIG. 6 and includes a power train gear 1 driven by a wound torsion spring 100 to provide the source with energy for storage and controlled release. When, for example, the mechanical pulse generator 10 is incorporated in an implanted artificial cardiac pacer, the spring 100 connected to power train 1 can be wound by the patient using a non-contact winding means such as known magnetic torquers. Another method of supplying power to source 9 which does not require regular attention by the patient is described further on in the specification. In the arrangement of FIG. 6, power train gear 1 meshes with a gear 2 to which is connected an escapement wheel 3 for rotation therewith along a common axis. Escapement wheel 3, in turn, engages a pair of pins extending from a pallet member 4 which is pivoted at 5. Pallet member 4 also engages a projecting pin offset from the center of a balance wheel 6 to which a hairspring 7 is connected in a known manner. Gear 2 also meshes with an output gear 8 connected to shaft 11. The arrangement of escapement 3, pallet member 4 and balance wheel 6 insure that rotations of gear 1 are transmitted through gear 2 to output gear 8 in a regulated, controlled manner similar to that of conventional clock mechanisms. Inasmuch as similar clock work mechanisms are readily available and well understood by those familiar with that art, this brief description is deemed to be sufficient. In addition, the foregoing is merely illustrative of other regulated mechanical energy sources which are included within the scope of the present invention.

The mechanical pulse generator 10 of the present invention further comprises a motion producing means indicated generally at 12 in FIGS. 1 and 4 and having its input mechanically coupled to output shaft 11 of the regulated mechanical power source. Motion producing means 12 functions, briefly, to produce a relatively rapid or abrupt, intermittent mechanical motion having a consistent velocity characteristic during each cycle of operation of pulse generator 10. The motion produced by means 12 is cyclic, of a duration less than that of each cycle of operation of generator 10. The motion producing means 12 stores mechanical energy and releases a small fraction of that energy always at the same release or trigger point location thereby producing motion having a consistent velocity characteristic. In particular, if motion producting means 12 acquires any additional energy during a cycle of operation thereof, this additional energy is dissipated in the form of motion beyond the trigger point whereupon there is a return to the trigger point in readiness for the next cycle. Should there be a loss of energy during one cycle such that the trigger point cannot be reached, there will be no output during the following cycle but means 12 will reach the trigger point in readiness for the next cycle thereafter. The combination of a source of mechanical power, such as source 9, and motion producing means 12 according to the present invention produces high power over a short duty cycle from a source providing low power over a long duty cycle. In other words, the intermittent mechanical power level available during the generation of the electrical pulse is many times greater than the continuous mechanical power level delivered to the mechanical pulse generator.

Motion producing means 12 is operatively associated with a transducer means, a portion of which is indicated generally at 14 in FIG. 1, for converting the motion produced by means 12 into electrical pulses. The pulses are available between output leads 15 and 16 of transducer 14. The electrical pulses are produced at a constant repetition frequency as determined by the regulated mechanical power source of FIG. 6, and at a constant amplitude as determined by the consistent velocity characteristic of motion producing means 12. When mechanical pulse generator 10 is employed in an artificial cardiac pacer, leads 15, 16 would be connected either directly or through pulse shaping circuitry to corresponding ones of at least two electrodes connected to a patient. In particular, one of the electrodes would be surgically placed in contact with the heart of the patient and another would be surgically connected to a reference potential point in the patient's body as is readily known by those familiar with artificial cardiac pacer.

Referring now in detail to FIGS. 1–5, motion producing means 12 is located within a housing which in the present illustration comprises first and second housing members 19 and 20, respectively, each in the form of a plate. Members 19, 20 are disposed in generally parallel planes and supported by a plurality of rigid spacing members 21, there being four such members 21 in the present illustration attached to the respective corners of plate members 19, 20. This arrangement is illustrative of various shapes and forms which the housing can assume. When pulse generator 10 is employed in an artificial cardiac pacer, the housing will be quite small because the entire mechanical pulse generator 10 can be packaged within the physical confines of presently available cardiac pacer wherein the external housing or sealed container has a diameter of about 2½ inches and a thickness of about 1¼ inches.

Motion producing means 12 comprises a first inertial member or element in the form of wheel or disc 23 movably or rotatably mounted in the housing. In particular, wheel 23 is provided with a hub 24 rotatably positioned on a shaft 25 journalled at opposite ends in bearings mounted in plates 19, 20. Shaft 25 is provided with a collar 25' and wheel 23 is journalled on collar 25'. Shaft 25 in the present illustration is formed to have ends which terminate in sharp points. The bearings, in turn, each comprise a bolt member 26 provided with a recess in one end for receiving a corresponding pointed end of shaft 25 and a nut 27 threaded on bolt 26 and mounted on a corresponding one of the plates 19, 20. Wheel 23 is mechanically connected to output shaft 11 of the regulated source by means including a first gear 28 fixedly mounted on hub 24 so as to be rotatable therewith and a second gear 29 fixedly mounted on shaft 11. Shaft 11, connected at the other end to gear 8 of the regulated source of FIG. 6, extends through plate 19 and is rotatably supported therein such as by a bushing. Gear 29 is located so as to be in meshing relationship with gear 28, and gear 29 is segmented, i.e. being without teeth along a portion of the periphery or circumference thereof, for a purpose to be described.

Figure 2:
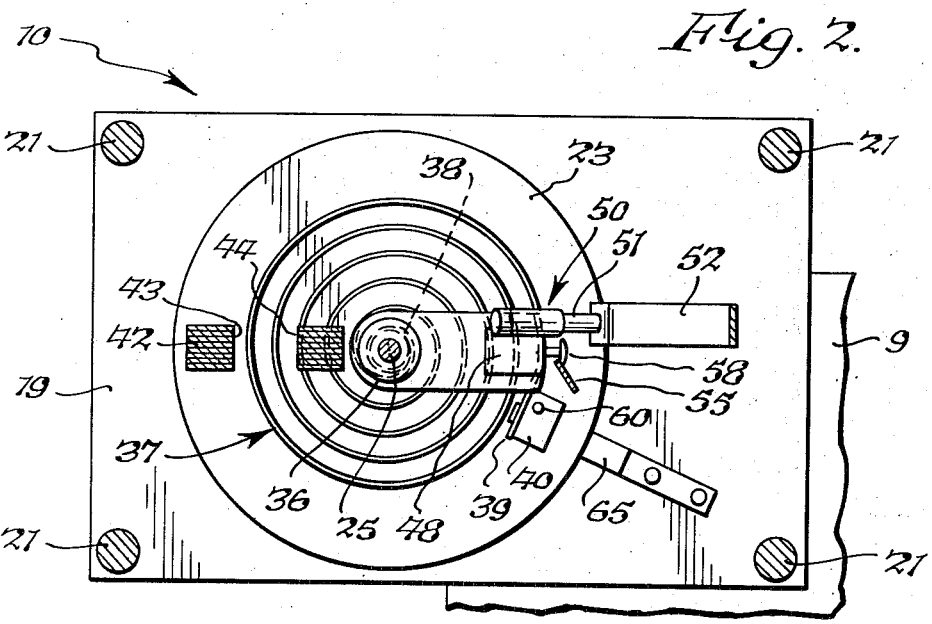
FIG. 2 is a sectional view taken about on line 2—2 in FIG. 1.
Figure 3:
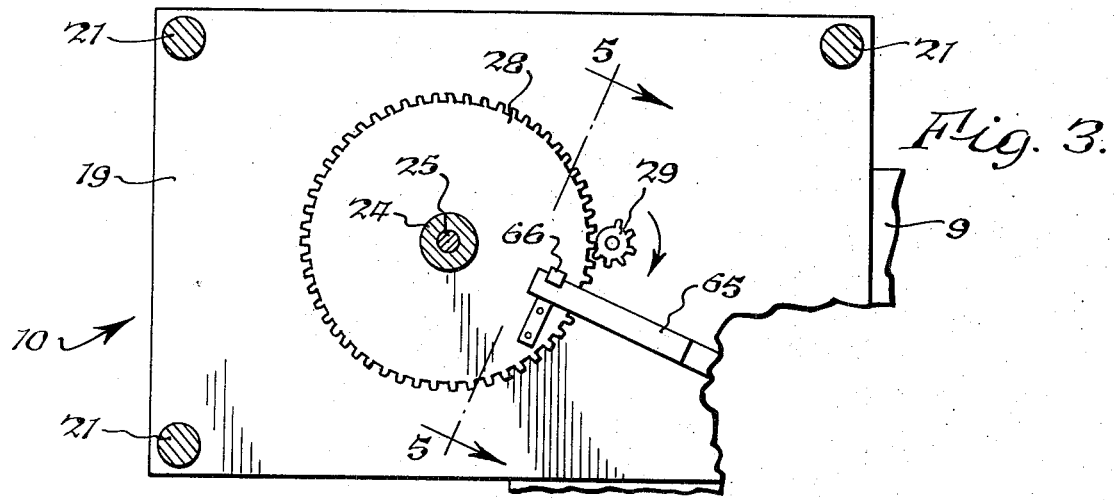
FIG. 3 is a sectional view taken about on line 3—3 of FIG. 1.

Motion producing means 12 further comprises a second inertial member or element 34 movably or rotatably mounted in the housing and spaced from the first inertial member or wheel 23. In the present illustration, inertial members 23 and 34 have a common rotational axis, and member 34 is elongated or generally rectangular in form. It is to be understood, however, that member 34 could also comprise a wheel or disc member similar to the member 23. Referring now to FIGS. 1 and 2, inertial member 34 is connected at one end thereof to shaft 25 such as by means of a hub-like member or portion 36 provided on that end of member 34 and secured by pin 36' to shaft 25 so as to be rotatable therewith. Accordingly, inertial members 23 and 34 are mounted for independent rotation about a common axis, in particular about the axis of shaft 25. Motion producing means 12 further comprises energy storage means in the form of an elastic coupling means 37, connected at each end thereof to a corresponding one of the first and second inertial members 23 and 34, respectively. In particular, coupling means 37 comprises a torsion spring positioned so that the convolutions thereof are generally concentric with the axis of shaft 25. The inner end 38 of spring 37 is connected or attached to inertial member 34, such as to hub 36, and the outer end 39 of spring 37 is connected to wheel 23, for example to a block member 40 which is fixedly attached to a surface of wheel 23.

The portion of the transducer means designated 14 includes a magnetic core 42 which is suitably attached to plate member 20 and includes opposed depending leg members which terminate in spaced-apart pole pieces 43 and 44 which define therebetween an air gap. Core 42 preferably is laminated and of high permeability and low residual magnetism, for example, soft iron. A winding 45 is provided on core 42 and is electrically connected to leads 15 and 16. The transducer means further comprises a permanently magnetized slug member 48 of iron, alnico or similar material fixedly attached or otherwise mounted on inertial member 34 so as to be carried thereby. The size of slug member 48 and the position thereof on member 34 together with the size and location of the air gap defined between pole pieces 43, 44 of core 42 are selected so that slug 48 can be moved by member 34 through the gap between pole pieces 43, 44 as illustrated by the broken line showing in FIG. 1. Accordingly, in response to a rapid movement of member 34, slug 48 is carried through the magnetic field between pole pieces 43, 44 at a relatively high velocity thereby generating an output electrical pulse or signal between leads 15 and 16 as a result of the very rapid change in the magnetic flux through coil 45.

The motion producing means 12 further comprises means for stopping the first and second inertial members 23 and 34, respectively, at predetermined times during each cycle of operation of pulse generator 10. Referring now to FIG. 1 there is provided a first stopping means 50 including a member 51 adapted to selectively engage or contact inertial member 34 or a portion thereof and a resilient bracket member 52 connecting member 51 to plate 20 of the housing. In particular, bracket 52 is generally U-shaped having one leg thereof suitably secured or attached to the undersurface of plate 20 and disposed so that the other, free leg thereof extends toward inertial member 34 at a slight angle, inclining member 51 slightly upwardly away from the free leg. Member 51 is of generally cylindrical shape, attached at one end to the free leg of bracket 52, and extends a sufficient distance toward shaft 25 so as to engage or contact slug 48 which is attached to member 34. In other words, member 51 of stopping means 50 comprises a spring-loaded inclined plane positioned above and generally parallel to the surface of slug member 34 so as to clear member 34 but interfere with a portion of slug 48. Members 51 and 52 are designed so as to provide an inclined plane of a moderately low spring constant with high initial deflection. In addition, the inclined plane of stopping means 50 is located, relative to the circular path of slug 48, 180° ahead of the location of the air gap between pole pieces 43 and 44. For convenience of description, the location of the inclined plane will be designated 0°.

The stopping means further comprises a member 55 in the form of a bar attached at one end to plate 20 and depending therefrom down to a level slightly below the level of a pin member 58 provided in the end of inertial member 34 and having a rounded head or projecting end. In addition, member 55 is disposed radially outwardly of member 34 so as to interfere selectively with pin 58. In particular, member 55 extends through plate 20 and is provided with a return bend which is suitably fixed or attached to a mounting block on the upper surface of plate 20. Member 55 is disposed at an angle as best seen in FIG. 2 whereby as inertial member 34 moves toward bar 55 in one direction, pin 58 will travel thereby, camming it out of the way, but pin 58 will be stopped and held by bar 55 when member 34 moves in the opposite direction. Member 55 is constructed in a manner to prevent vibration thereof which might otherwise cause pin 58 to be missed upon the return movement of member 34. Furthermore, member 55 and its relationship with pin 58 is such as to provide an inclined plane of a spring constant grossly lower than that provided by member 50. Stop member 55 is positioned about 165° past the location of the magnetic gap defined between pole pieces 43, 44 relative to the direction of travel of inertial member 34.

The amount of relative rotation between inertial members 23 and 34 about the axis thereof can be restricted by means in the form of a pin member 60 mounted in block 40 and extending generally vertically therefrom a distance sufficient to engage pin 58. The amount of rotation of gear 28 in one direction is limited by a ratchet-type mechanism which in the present illustration comprises an arm member 65 extending above and generally parallel to the upper surface of gear 28 and attached at the other end thereof to plate 19 of the housing. A latch member 66 is secured to the upper surface of gear 28 and presents an inclined plane to arm 65 in one direction of rotation of gear 28 and a catch in the other direction of rotation. The location of pin 60 and of the ratchet mechanism comprising arm 65 and catch 66 relative to each other and to the other stopping members about the axis of shaft 25 will be explained hereafter.

It should be noted that various alternative arrangements can be substituted for the foregoing stop mechanisms without departing from the spirit and scope of the present invention. For example, member 58 could be replaced by a single bolt-like member extending through inertial member 34 generally perpendicular to the plane thereof in a manner such that the rounded portion is proximate the upper surface of member 34. This rounded surface would be removed at one side thereof so as to provide a rachet-type stop. This would obviate the need for slug 48 to serve as a stop member and, therefore, could be repositioned onto the peripheral edge of member 34. This, in turn, would require a modification in core 42 whereby pole piece members 43, 44 would be located generally below and above, respectively, inertial member 34. In addition, member 55 would be formed to include an inclined plane disposed generally above member 34 in a manner similar to the plane provided by member 50. Pin member 60 would have the same form and location whereby it would contact the lower portion of the bolt member extending below member 34.

The overall operation of pulse generator 10 according to the present invention is as follows: the mechanical power source within housing 9, as shown in detail in FIG. 6, delivers mechanical power at a regulated rate which in the present illustration is available in the form of a rotation of shaft 11. Motion producing means 12 is coupled to the output of that source for cyclically producing a relatively rapid mechanical motion of a duration less than that of each cycle of operation of pulse generator 10 and having a consistent velocity characteristic. In particular, during each cycle of operation of mechanical pulse generator 10, inertial member 34 is moved to carry slug 48 through the air gap between pole piece elements 43, 44 at a relatively high velocity thereby generating an electrical output pulse. The electrical pulses are produced at a constant repetition frequency as determined by the mechanical power source driving shaft 11 and at a constant amplitude and waveshape as determined by the consistent velocity characteristic of motion producing means 12. Furthermore, the intermittent mechanical power level available during the generation of the electrical pulse is many times greater than the continuous mechanical power level delivered to the mechanical pulse generator.

The consistent velocity characteristic results from the fact that inertial member 34 is released for its high velocity motion from the same release point or trigger point during each cycle of operation of motion producing means 12. The fixed location of the release or trigger point in motion producing means 12 is determined by the force constant of torsion spring 37 and by the angular positions of the stop means, for example member 55, as will be described in detail presently. Furthermore, if inertial member 34 were to gain or lose energy during any cycle of operation, it will overshoot or fall short of, respectively, the release or trigger point. In the former case, the energy gained is dissipated in the motion beyond the trigger point whereupon member 34 returns to that point in readiness for the next cycle. In the latter case, the energy lost prevents member 34 from reaching the trigger point so that during the very next cycle no output pulse is produced but the system operates during that cycle to move inertial member 34 up to the trigger point in readiness for the next cycle.

According to the present invention, inertial member or wheel 23 is coupled to the mechanical power source driving shaft 11 in a manner whereby member 23 is drivenly connected to the source for a portion of each cycle of movement of member 23 and is freely movable during the remainder of each cycle thereof. The first and second inertial members 23 and 34, respectively, are stopped at predetermined positions during each cycle of operation generating an electrical pulse. As a result, the kinetic energy of member 34 after generation of the pulse is transmitted to the elastic coupling means or torsion spring 37 and is stored therein until inertial member 23 becomes freely movable. At that time, torsion spring 37 moves member 23, member 34 is moved therewith into position for the next cycle of operation, and the kinetic energy of member 23 is transmitted to torsion spring 37 and stored therein for use during the next cycle. Only a small fraction of the energy stored in torsion spring 37 is consumed during each cycle. When mechanical pulse generator 10 is incorporated in an artificial cardiac pacer, each cycle of operation has a duration of about one second, in other words shaft 11 is rotated at a constant rate and causes wheel 23 to make intermittent revolutions at the rate of once per second.

Figure 10:
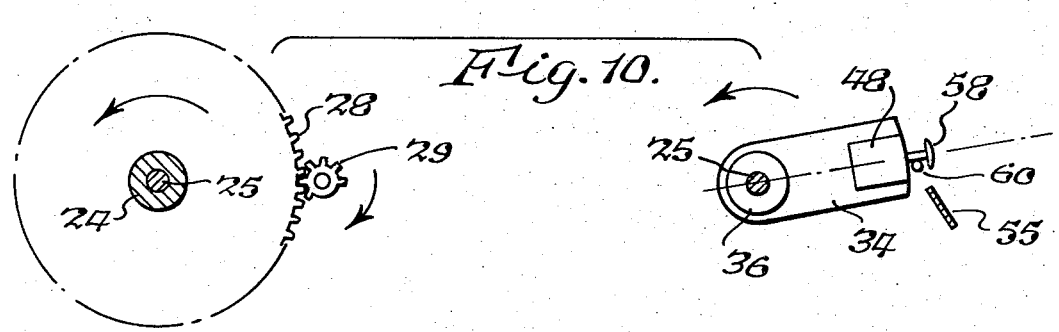
FIGS. 10–13 are fragmentary views of the apparatus of the present invention showing various positions of parts thereof during operation.

The detailed manner of operation of pulse generator 10 according to the present invention is as follows. Input energy is delivered to the mechanical power source of FIG. 6 such as by winding a spring coupled to the power train gear 1. When the spring is in a fully wound condition the energy stored therein tends to rotate gear 1 whereupon the mechanism illustrated in FIG. 6 functions to release power in a controlled manner by rotating shaft 11 at a constant rate. This rotation is transmitted through gears 29 and 28 to cause a rotation of inertial member or wheel 23. A first cycle of operation of pulse generator 10 begins with inertial member 34 positioned whereby pin 58 is located between the inclined planes provided by members 50 and 55. Inertial member 34 is in a freely movable position and torsion spring 37 is in a neutral position or in a position of zero deflection. Wheel 23, being driven through gears 28 and 29, begins to rotate about shaft 25 and the movement thereof is coupled through spring 37 to member 34. Wheel 23 and inertial member 34 rotate together until slug member 48 contacts the inclined plane defined by member 50. For purposes of illustration this location relative to the axis of shaft 25 will be designated zero degrees. Inertial wheel 23 continues to rotate and because inertial member 34 is held against further movement, torsion spring 37 begins to wind up. Inertial wheel 23 continues to rotate until member 60 contacts the shank of pin 58. The torque of inertial wheel 23 plus the torque of torsion spring 37 overcomes the holding force of the inclined plane defined by member 50 whereupon inertial member 34 is released by camming member 50 out of the way. FIG. 10 illustrates the relative positions of member 34, pin 60, and gears 28, 29 at the time of release.

Upon release, member 34 accelerates rapidly and carries slug member 48 through the air gap between pole pieces 43, 44 (FIG. 11) thereby generating an output electrical pulse which then is available between leads 15 and 16. Member 34 continues its travel, moving much faster than wheel 23, and carries slug member 48 beyond air gap, beyond the neutral point of torsion spring 37 and beyond the inclined plane defined by member 55, camming it out of the way. This inclined plane is located at about 345° about the axis of shaft 25 beyond the point of release of member 34. Inertial member 34 completes its movement in this direction before reaching the inclined plane defined by member 50 and transmits essentially all of its kinetic energy back into torsion spring 37. Inertial member 34 then reverses its direction and is moved by spring 37 back toward the inclined plane provided by member 55 at which point it is held by pin 58 against further movement in that direction.

Figure 11:
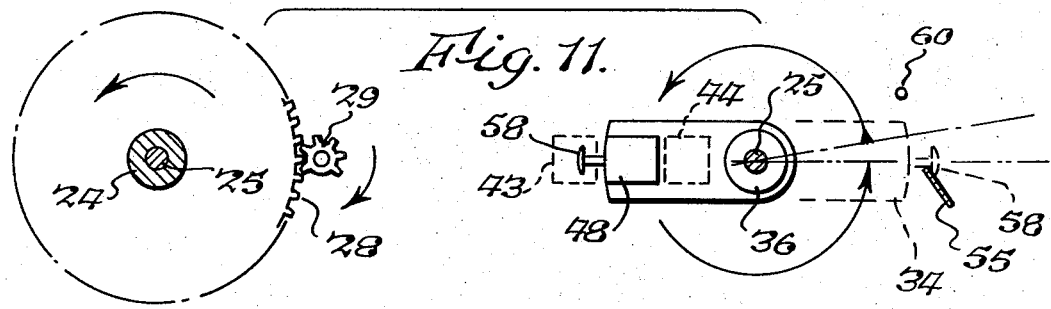

This portion of a cycle of operation of pulse generator 10 is illustrated in FIG. 11. It will be noted that during this relatively rapid movement of member 34, wheel 23 has continued to rotate in a forward direction as indicated by the new angular position of pin 60 about the axis of shaft 25. Inertial member 34 being held in position against inclined plane 55 maintains force on torsion spring 37 until inertial wheel 23 is freely movable. In other words, wheel 23 is not freely movable relative to the system as long as gears 28 and 29 are in meshing relationship.

Figure 12:
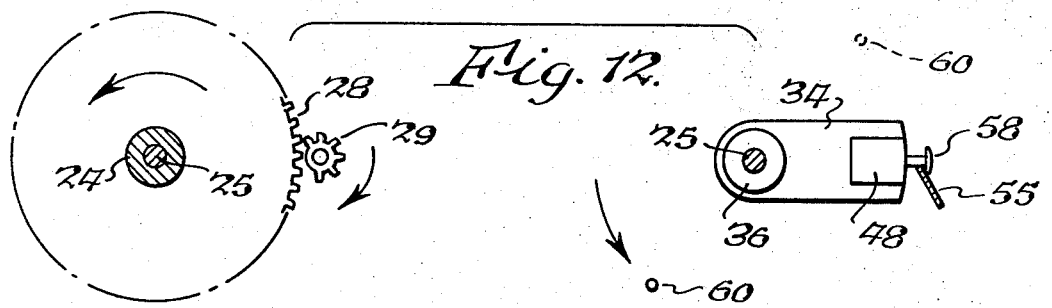
Figure 13:
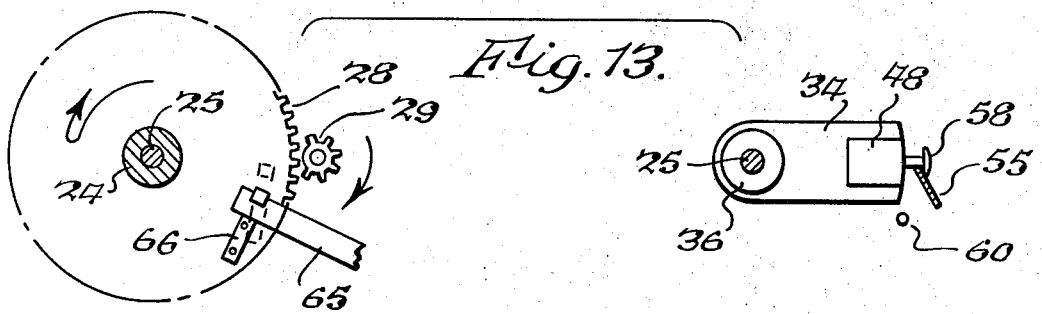

A small interval of time after inertial member 34 is held in position by engagement between pin 58 and inclined plane 55 and by the torque of torsion spring 37, the teeth of gear 28 reach the segmented or toothless portion of gear 29 whereupon inertial wheel 23 is released. This is illustrated in FIG. 12. Upon release, inertial wheel 23 gains angular momentum, being driven by spring 37 until it reaches the neutral point of torsion spring 37 since inertial member 34, being held, has maintained tension in spring 37. The momentum of wheel 23 carries it past the neutral point of torsion spring 37, whereupon both wheel 23 and member 34 rotate until slug 48 carried by member 34 contacts the inclined plane provided by member 50 which prevents further forward rotation of member 34. This of course occurs at the zero degree location as previously defined. Inertial wheel 23, however, continues to rotate until it rewinds torsion spring 37 in the forward direction, during which it completely converts its kinetic energy into potential energy of torsion spring 37, whereupon it stops and tends to rotate in the opposite direction. The ratchet comprising arm 65 and member 66 prevents reverse angular motion of wheel 23 thereby maintaining tension in torsion spring 37, and although wheel 23 may travel a short distance beyond or overshoot the ratchet, wheel 23 will reverse direction and return to the ratchet whereupon it is caught or held thereby as shown in FIG. 13. Member 65 is constructed in a manner to prevent vibration thereof which might otherwise cause member 66 to be missed upon the return movement of wheel 23. Pulse generator 10 now exists in a condition of rest until the toothed portion of gear 29 again engages the teeth of gear 28 to rotate wheel 23 in the forward direction to begin the next cycle of operation.

Motion producing means 12 causes movement of inertial member 34 during each cycle of operation at a consistent velocity characteristic which, in turn, causes generation of output electrical pulses at a constant amplitude and waveshape. This is because inertial member 34 is released for its high velocity motion from the same release point or trigger point during each cycle of operation of motion producing means 12. The location of the release or trigger point is fixed in terms of the force constant of torsion spring 37 and the angular location about shaft 25, and along the path of member 34, of the stops provided by members 50 and 55. If inertial member 34 were to gain energy during any cycle of operation of pulse generator 10, the energy gained is released from member 34 in the form of motion beyond the stop provided by member 55 whereupon member 34 reverses direction and returns so that pin 58 engages stop member 55 and inertial member 34 is ready for the next cycle. If inertial member 34 were to lose energy during any cycle, it will not reach and be latched by member 55 with the result that member 34 does not reach the trigger point. During the very next cycle no output pulse is generated but the system operates during that cycle to move inertial member 34 up to the release or trigger point in readiness for the next cycle. Similarly, if wheel 23 and hence gear 28 were to gain or lose energy during any cycle of operation, it will overshoot or undershoot, respectively, the ratchet provided by members 65, 66 resulting in either dissipation of the incremental energy or absence of the next pulse together with energy makeup.

Members 50, 55 and 65 thus serve as stop means or catch means which due to their fixed location in motion producing means 12 cause inertial member 34 to be released at the same point or location during each cycle of operation. The rotation of wheel 23 with member 60 in contact with the shank of pin 58 until the torque of wheel 23 plus the torque of spring 37 overcomes the holding force of member 50 to release member 34 is analogous to triggering of a spring-powered member as in a gun. The system can be viewed as including an upper wheel (member 34) and a lower wheel (wheel 23 and gear 28) independently rotatably mounted and tied together by torsion spring 37. The lower wheel is driven at one revolution per second and the upper wheel is alternately caught and released. Rotation of the lower wheel while the upper wheel is caught or latched stores energy in the torsion spring which is dissipated during the rapid rotation of the upper wheel.

In the present illustration, the pitch diameter of segmented gear 29 is a small fraction, for example about 1/14, of the pitch diameter of gear 28. About a 30 degree circumferential segment of gear 29 contains no teeth. Wheel 23 travels through a small ratcheting arc whereupon the ratchet provided by arm 65 engaging latch member 66 prevents further backswing. The magnitude of the ratcheting arc is dependent upon the efficiency of the generating system, and determines the overall electromechanical efficiency of generator 10. In particular, the efficiency of the generating system determines how small the ratcheting arc can be because the arc must be shorter in length than the geared circumference of gear 29 and the length of the geared circumference of gear 29 must be long enough to replace the energy lost during each cycle of pulse generation. The arc also must be long enough to insure that inertial wheel 23 will reach the ratchet position otherwise alternate pulses will be missed. The arc length inherently determines the overall efficiency of pulse generator 10 because it determines the ratio of diameters between segmented gear 29 and gear 28. This ratio, in turn, determines the magnitude of power drain from the regulated mechanical power supply during each cycle of operation. Thus the shorter the arc, the smaller the segmented gear 29 which can be used and the lower will be the power drain from the storage means in the power supply of FIG. 6.

According to a preferred mode of the present invention, torsion spring 37 will be relatively short and have a relatively high spring constant, and inertial element 34 will be relatively light in weight and have almost zero velocity at the instant it is held by member 55. In particular, when inertial member 34 comprises part of a wheel having a diameter of about 2 inches, the spring constant of torsion spring 37 should be about 0.15 inch - pounds at 180° deflection. The size and shape of the output electrical pulses will remain uniform because they are primarily related to the catch strength of member 50, the torsional spring rate of spring 37 and the inertia of member 34.

FIG. 7 illustrates the waveform of the output electrical pulse obtained during each cycle of operation of pulse generator 10. The output pulse illustrated in FIG. 7 occurs between leads 15, 16 and includes both positive-going and negative-going portions. If this waveform were applied to the heart, then in accordance with prudent pacer practice the terminals would be arranged so that the negative-going portion is applied first to the heart. In some instances, however, it may be physiologically desirable to produce an output waveform having only a negative-going portion. To this end, the wave-shaping circuit illustrated in FIG. 8 can be added to the output of pulse generator 10. In particular, lead 15 is connected to one terminal of a capacitor 70, the other terminal of which is connected to the anode of a diode 71. The cathode of diode 71 is connected to lead 16. The circuit includes a second capacitor 72, one terminal of which is connected to the anode of diode 71 and the other terminal of which is connected to a pulse generator output terminal 73. A second output terminal 74 is connected to lead 16 and the cathode of diode 71. When the waveform of FIG. 7 is applied to the input of the circuit of FIG. 8, the output waveform shown in FIG. 9 appears across terminals 73, 74.

FIG. 14 illustrates an alternative arrangement for driving the regulated mechanical power source 9 which utilizes the fluctuating pressure which exists naturally in the tissue adjacent to a beating heart. A human heart is indicated diagrammatically at 80 and the arrows 81 represent the direction of heart wall motion giving rise to fluctuating pressure in adjacent tissue 83. A bladder 85 is surgically implanted in tissue 83 adjacent heart 80, and the interior of bladder 85 is connected by a tubing or conduit 87 to the interior of a bellows 89 which is surgically implanted in neighboring tissue 90. The interior of bladder 85, tube 87 and bellows 89 are filled with an hydraulic fluid in the form of a saline solution. Thus, motion of the wall of heart 80 causes effects in tissue 83 which, in turn, give rise to pressure fluctuations and fluid motion in the hydraulic system comprising bladder 85, conduit 87 and bellows 89 resulting in a mechanical movement or motion of bellows 89. The movement of bellows 89, in turn, is coupled through a link member 93 and a ratchet mechanism 94 to the input of mechanical regulator 9 shown in FIG. 6, in particular the output of ratchet 94 winds up storage spring 100 connected to gear 1. Thus, bladder 85 comprises a transducer for converting tissue movements into fluid motion and pressure fluctuations, and bellows 89 comprises another transducer mechanically coupled to the input of mechanical power source 9 for converting fluid motion and pressure fluctuations into mechanical movements for driving source 9.

A pacing or stimulating electrode, indicated diagrammatically at 96, is surgically placed in contact with heart 80 and is connected by lead 97 to the output of pulse generator 10. Lead 97 is enveloped by moisture-proof and human body reaction-free material such as silicone rubber or suitable plastic. A reference electrode 99 also is surgically placed in contact with heart 80.

It is advantageous that the system including bladder 85, line 87 and bellows 89 together with the fluid therein be operated as a resonant system. In the first place, an improperly tuned system would be undesirable because it would create reflected hydraulic pulses interfering with new pulses traveling along line 87 toward bellows 89. In the second place, operating the system at resonance improves the overall efficiency because less energy of motion from the wall of heart 80 and the adjacent tissue 83 is required to produce a given amount of windup of mechanical regulator 9. System resonance is a function of the length and inner diameter of line 87, the elasticity of the walls of the hydraulic system, and the viscosity of the hydraulic fluid.

Bladder 85 preferably is formed from 0.020 medical grade silicone elastomer sheet material and has a nipple-like connector which is dimensioned to fit smoothly with the end of tubing 87. While not immediately apparent from the perspective type illustration in FIG. 14, the main body portion of bladder 85 is substantially disc shaped having a diameter of about 2.5 inches and a thickness or width or about 0.415 inch. Tube or conduit 87, also of silicone elastomer material, preferably has an inner diameter of ¼ inch and an outer diameter of ⅜ inch.

Bellows 89 preferably is of medical grade silicone elastomer material and formed in the general shape of a thimble having a length of about 1.10 inches. At the larger end, bellows 89 has a diameter of 1.00 inch and has a relatively thick annular end portion 103. Portion 103 in the present example is fixedly secured to a sealing member 101 which seals tube 87 in fluid communication with the interior of bellows 89. The wall of bellows 89 is formed at the other end in an annular return bend which terminates inwardly of bellows 89 in a relatively thick disc 105 having a thickness of about 0.10 inch disposed in a plane perpendicular to the axis of tubing 87 and positioned about 0.50 inch inwardly from the larger end of bellows. Disc 105 is connected to one end of link 93, and the stroke length of the reciprocating movement of disc 105 and link 93 preferably is about 0.25 inch.

It is therefore apparent that the present invention accomplishes its intended objects. Mechanical pulse generator 10 advantageously can be employed in an artificial cardiac pacer to provide high inherent reliability, an absence of electrochemical elements such as batteries, and a lifetime which is limited by mechanical wear rather than by depletion of power supplies. This in turn results in a unit which can be completely sealed and which has a predictable useful lifetime so as to be satisfactory for pacer of the implanted type.

Mechanical pulse generator 10 provides output electrical pulses which have a constant repetition frequency as determined by the regulated mechanical power source driving shaft 11 and which pulses have a constant amplitude as determined by the consistent velocity characteristic of motion producing means 12. The intermittent mechanical power level available during the generation of the electrical pulse is many times greater than the continuous mechanical power level delivered to the machanical pulse generator. Mechanical pulse generator 10 produces output electrical pulses having the relatively low oscillation frequency needed for cardiac stimulation, and the operation of motion producing means 12 giving rise to such pulse generation is at a high kinetic energy whereby the mechanical energy expended in producing each electrical pulse represents only a small fraction of the stored mechanical energy. In particular, during each cycle of pulse generator 10, motion of inertial element 34 causing generation of a pulse is followed by a transfer of kinetic energy from element 34 to spring 37 for temporary storage and then to inertial element 23 to move the same when it becomes uncoupled from the mechanical power source. Kinetic energy of motion of element 23 also is transferred to spring 37, and the fraction of the stored power in the regulated source consumed in each cycle of pulse generation is related to the angular distance between members 50 and 55. This distance, which is relatively small, is a measure of the distance inertial element 23 must move inertial element 34 to make up the potential energy of the mechanical system lost during each cycle of operation.

While a single specific embodiment of the present invention has been described in detail, this has been done for the purpose of illustration without thought of limitation.

We claim:

1. A medical electronic pulse generator comprising:

a. a source of mechanical power for delivering mechanical power at a regulated rate;
b. motion producing means coupled to the output of said source for cyclically producing a relatively rapid mechanical motion of a duration less than that of each cycle of said pulse generator, said motion producing means storing mechanical energy from said source and including means for releasing a portion of the stored energy always at the same location whereby the motion produced thereby has a consistent velocity characteristic;
c. transducer means for converting mechanical motion into electrical energy and positioned in operative relationship to said motion producing means in a manner such that the motion produced by said motion producing means causes said transducer means to produce an electrical pulse; and
d. pulse output means connected to said transducer means and adapted to be operatively coupled to a patient;
e. whereby electrical pulses are produced at a constant repetition frequency as determined by said mechanical power source and at a constant amplitude and wave shape as determined by the consistent velocity characteristic of said motion producing means.

2. A pulse generator according to claim 1, wherein said motion producing means comprises a movable inertial element carrying an element of magnetic material and means for coupling the output of said mechanical power source to said inertial element for cyclically causing a rapid movement of said inertial element during each cycle of operation of said pulse generator and wherein said transducer means comprises magentic means defining an air gap and positioned relative to said inertial element and said motion producing means whereby said magnetic element is carried rapidly through the air gap to generate an output electrical pulse in response to each rapid movement of said inertial element.

3. A pulse generator according to claim 1, wherein said motion producing means comprises:
a. an element mounted for cyclic movement in a manner causing said transducer means to produce cyclic electrical pulses;
b. energy storage means connected to said element;
c. means connected to said energy storage means and coupled to said source of mechanical power for causing movement of said element; and
d. means for stopping said element after each movement producing an electrical pulse and for releasing said element for the next movement thereof always at the same location along the path of said element.

4. A pulse generator according to claim 3 wherein said stopping means is positioned at a location along the path of said element such that said energy storage means receives and stores the kinetic energy of said element after generation of a pulse as potential energy in said motion producing means whereby only a relatively small fraction of stored energy in said energy storage means is used as mechanical power for generating each output electrical pulse.

5. A pulse generator according to claim 1 wherein said motion producing means comprises:
a. a housing;
b. a first inertial element mounted for movement in said housing;
c. coupling means for coupling said first inertial element to said power source in a manner whereby said first inertial element is drivenly connected to said source for a portion of each cycle of movement of said first element and is freely movable during the remainder of each cycle thereof;
d. a second inertial element mounted for movement in said housing in a manner causing said transducer means to produce an electrical pulse;
e. elastic coupling means connected at each end thereof to a corresponding one of said first and second inertial elements; and
f. means for stopping said first and second inertial elements at predetermined times during each cycle of operation generating a pulse, whereby the kinetic energy of said second element after generation of the pulse is transmitted to said elastic coupling means and stored therein until said first element becomes freely movable whereupon said elastic coupling means moves said first element, said second element is moved therewith into position for the next cycle, and the kinetic energy of said first element is transmitted to said elastic coupling means and stored therein for use in the next cycle.

6. A pulse generator according to claim 1 wherein said mechanical power source provides a rotary output and wherein said motion producing means comprises:

a. a housing;
b. a first wheel rotatably mounted in said housing;
c. coupling means for coupling said first wheel to said power source in a manner whereby said first wheel is drivenly connected to said source for a portion of each cycle of rotation of said source and is freely movable during the remainder of each cycle thereof;
d. a second wheel rotatably mounted in said housing and positioned in a manner such that movement of said second wheel causes said transducer means to produce an electrical pulse;
e. torsion spring means connected at each end thereof to a corresponding one of said first and second wheels; and
f. means for alternately releasing said second wheel for movement causing said transducer means to produce a pulse and for retaining said first wheel during each cycle of operation generating a pulse.

7. A pulse generator according to claim 6, wherein said motion producing means further comprises means for stopping said first and second wheels at predetermined times during each cycle of rotation of said power source whereby the kinetic energy of said second wheel after generation of a pulse is utilized to store energy in said spring means and to position said first wheel for a next cycle.

8. A pulse generator according to claim 7 wherein said stopping means comprises:
a. first means responsive to torque applied in one direction of rotation of said second wheel for releasably holding said second wheel responsive to torque in said one direction of rotation of said second wheel, said first means being positioned 180° ahead of the location of said transducer means with respect to rotation of said second wheel in said one direction;

b. second means for engaging said second wheel at a point in the rotational movement thereof, said second means allowing rotation of said second wheel in said one direction but blocking rotation in the opposite direction, said second means being positioned at least about 90° and less than 180° beyond the location of said transducer means with respect to rotation of said second wheel in said one direction; and c. ratchet means limiting rotation in one direction on said first wheel during the portion of each cycle when said first wheel is freely movable.

9. A pulse generator according to claim 6 wherein said coupling means comprises:

a. a first gear coupled to the output of said mechanical power source so as to be rotated thereby, said gear being without teeth along a portion of the circumference thereof; and b. a second gear connected to said first wheel and positioned in meshing relationship with said first gear, said second gear having a larger number of teeth than said first gear.

10. A pulse generator according to claim 9 wherein said first gear is without teeth along less than half the circumference thereof.

11. A pulse generator according to claim 1 further including means for converting fluctuating pressure which exists naturally in tissue adjacent a beating heart into mechanical movements for driving said mechanical power source, said converting means comprising:

a. first transducer means adapted to be implanted in tissue adjacent the heart for converting tissue movements into fluid motion and pressure fluctuations;

b. second transducer means mechanically coupled to the input of said mechanical power source for converting fluid motion and pressure fluctuation into mechanical movements; and c. means connected to said first and second transducers for placing said tranducers in fluid communication.

12. A pulse generator according to claim 1, wherein said motion producing means is operative to provide high power over a short duty cycle and said mechanical power source is operative to provide low power over a long duty cycle whereby the intermittent mechanical power level available during the generation of said electrical pulse is many times greater than the continuous mechanical power level delivered by said source to said motion producing means.

13. A pulse generator according to claim 1, wherein said motion producing means includes an element which is moved when said motion producing means releases said mechanical energy from said source, the movement of said element causing said transducer means to produce said pulse, and wherein said means for releasing a portion of the stored energy causes said element to be moved with said consistent velocity characteristic.

* * * * *